United States Patent [19]

Ewald

[11] 4,078,386
[45] Mar. 14, 1978

[54] MASTER CYLINDER ASSEMBLY

[75] Inventor: Jerome T. Ewald, South Bend, Ind.

[73] Assignee: The Bendix Corporation, South Bend, Ind.

[21] Appl. No.: 718,445

[22] Filed: Aug. 26, 1976

[51] Int. Cl.² ............................................. B60T 11/20
[52] U.S. Cl. ........................................ 60/562; 60/589; 60/592
[58] Field of Search ................... 60/562, 581, 589, 592

[56] References Cited

U.S. PATENT DOCUMENTS

| 2,332,301 | 10/1943 | Cox | 60/562 |
|---|---|---|---|
| 3,068,651 | 12/1962 | Shutt | 60/562 |
| 3,667,229 | 6/1972 | Cresto | 60/578 |
| 3,914,941 | 10/1975 | Gardner | 60/562 |
| 3,946,563 | 3/1976 | Rivetti | 60/562 |
| 3,978,670 | 9/1976 | Kruse | 60/592 |

FOREIGN PATENT DOCUMENTS

| 2,228,646 | 12/1974 | France | 60/581 |
|---|---|---|---|
| 488,771 | 7/1938 | United Kingdom | 60/562 |

Primary Examiner—Martin P. Schwadron
Assistant Examiner—Abraham Hershkovitz
Attorney, Agent, or Firm—Leo H. McCormick, Jr.; Ken C. Decker

[57] ABSTRACT

A master cylinder assembly for simultaneously actuating the front and rear wheel brakes of a vehicle. The master cylinder assembly includes a housing having a bore therein with a first piston separated from a second piston by a first spring to establish a first pressurizing chamber while a second spring separates the second piston from the bottom of the bore to establish a second pressurizing chamber.

The second piston has a first passage which connects the first pressurizing chamber to a reservoir in the housing and a second passage which connects the second pressurizing chamber to the reservoir. A guide on the second piston is located in a keyway in the housing to prevent the second piston from rotating. A first telescoping sleeve member located on the first piston is aligned with the first passage while a second telescoping member attached to the housing is aligned with the second passage. An operator input moves the first and second pistons and simultaneously interrupts the communication of fluid from the reservoir through the first and second passages by seating the second piston on the second telescoping member and the first telescoping member on the second piston. Thereafter, the fluid in the first and second chambers is pressurized to synchronize the actuation of the front and rear brakes.

5 Claims, 4 Drawing Figures

MASTER CYLINDER ASSEMBLY

BACKGROUND OF THE INVENTION

This invention relates to a split system master cylinder having compensator valves which close simultaneously to permit the development of substantially identical first and second hydraulic operating pressures to synchronize braking of the front and rear wheel brakes of a vehicle.

Most vehicles currently being produced are equipped with disc brakes on the front wheels and drum brakes on the rear wheels. The front wheel disc brakes require very little initial actuation pressure from a master cylinder, whereas substantial initial actuation pressure is required to move brake shoes into engagement with the brake drum on the rear wheel drum brakes. In order to achieve simultaneous actuation between the drum brakes on the rear and disc brakes on the front, a metering valve is required to delay the communication of braking pressure to the disc brakes until the drum brakes are actuated.

In order to meet proposed stopping distance requirements established by the Department of Transportation, it has been suggested that disc brakes be placed on both the front and rear on vehicles. A cost saving could be achieved from such a braking system if the metering valve was eliminated. Unfortunately, split system master cylinders, such as the master cylinder disclosed in U.S. Pat. No. 3,818,706 do not initially develop the same hydraulic pressures in the separate pressurizing chambers which supply the front and rear wheel brakes with actuating fluid. In such master cyliders, sequential movement of a first piston closes a first tilt valve to develop a first pressure force in a first chamber, and thereafter, the first pressure force and a resilient member move a second piston to close a second tilt valve and develop a second pressure force in a second chamber in the master cylinder. Thus, there is always a delay in the initial communication of the pressurized operating fluid supplied to the brake system connected to the second chamber.

SUMMARY OF THE INVENTION

I have devised a master cylinder assembly which simultaneously develops first and second fluid pressures for operating the front and rear disc brakes of a vehicle.

The master cylinder assembly includes a housing, a reservoir, first and second operating pistons, and first and second movable valve seats. The housing has a bore with first and second compensator ports connected to the reservoir. The first operating piston is separated from the second operating piston by a first spring to establish a first pressurizing chamber and the second piston is separated from the bottom of the bore by a second spring to establish a second pressurizing chamber. The first operating piston has a first passage therethrough for communicating fluid from the first compensator port into the first pressurizing chamber. The second operating piston has a second passage therethrough for communicating fluid from the second compensator port into the second pressurizing chamber. The first valve seat which is located in the first pressurizing chamber is connected to the second valve seat which is located in the second pressurizing chamber. A return spring urges the first and second valve seats toward the first and second pistons, respectively. An input force applied to the first piston moves the first and second pistons into engagement with the first and second valve seats, respectively, to interrupt the communication of fluid through the first and second passageways. Thereafter, the input force moves the first and second pistons and the first and second valve seats to simultanesouly pressurize the fluid in the first and second chamber to thereby actuate the front and rear wheel disc brakes of the vehicle at the same time.

In a second embodiment of the master cylinder assembly, the first and second passages, which connect the first compensator port with the first pressurizing chamber and the second compensator port with the second pressurizating chamber, are both located in the second piston. In this arrangement, the reservoir can be placed perpendicular to the housing to allow the master cylinder to be mounted closer to a slanted fire wall as used on some vehicles.

In a third embodiment of the master cylinder assembmly, the valve seat associated with the first piston is carried on the second piston to eliminate the need for a linkage seal between the first and second pressurizing chambers as required by the other embodiments.

It is the object of this invention to provide a master cylinder assembly having valve seat means, which are engaged and move with corresponding piston means in response to an input force, to permit the simultaneous actuation of the front and rear disc brakes on a vehicle.

It is an object of this invention to provide a master cylinder with piston means having compensation passages therethrough for connecting a reservoir to pressurizing chambers which supply a brake system with hydraulic fluid.

It is another object of this invention to provide fluid compensation means from a reservoir to first and second pressurizing chambers in a master cylinder through piston means located in the first and second pressurizing chambers.

It is another object of this invention to provide a valve means for controlling the flow of compensator fluid through piston means through movable valve seat means which simultaneously seal pressurizing chambers from a reservoir when an input force moves the piston means.

It is a further object of the invention to provide first and second piston means each having a compensation passage therethrough with movable valve seat means which are connected to each other to synchronize the pressurizing of fluid in a master cylinder to thereby actuate the front and rear wheel brakes of a vehicle at the same time.

These and other objects will become apparent from reading this specification and viewing the drawings.

DETAILED DESCRIPTION OF THE PREFERRED EMBODIMENT

Figure 1:
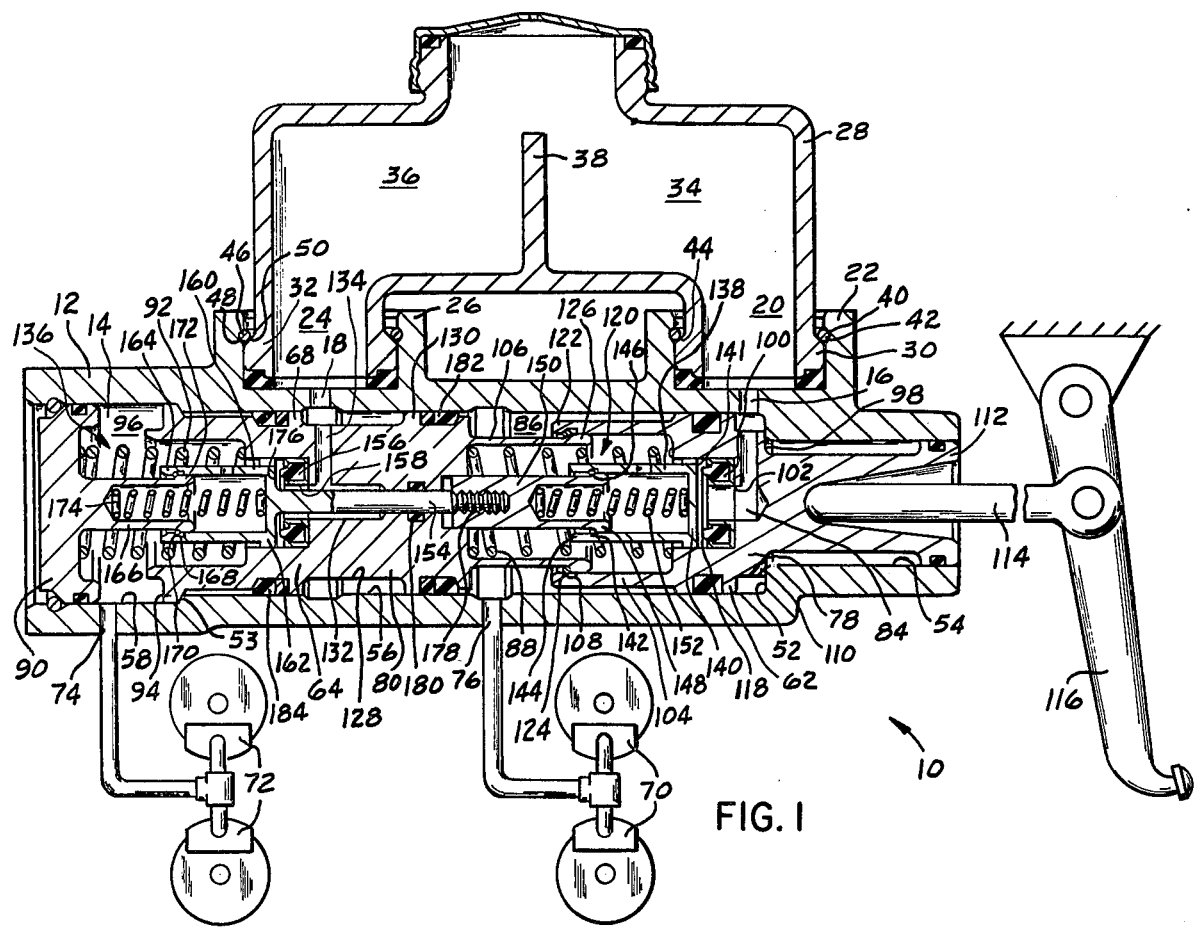
FIG. 1 is a sectional view of a master cylinder assembly constructed according to the teachings of my invention, which is schematically located in a braking system.

The master cylinder assembly 10 shown in FIG. 1 has a housing 12 with a bore 14 located therein. The housing 12 has first port 16 for connecting the interior 20 of a first annular projection 22 with bore 14 and a second port 18 for connecting the interior 24 of a second annular projection 26 with bore 14. A reservoir container 28 has a first tubular extension 30 which is located in the interior 20 of the first annular projection 22 and a second tubular extension 32 which is located in interior 24 of the second annular projection 26. The reservoir container 28 is divided into a first section 34 and a second section 36 by a wall 38.

The first annular projection 22 has a groove 40 which retains a first snap ring 42. The snap ring 42 acts on shoulder 44 of the reservoir 28 to retain the first tubular projection 30 in the first annular projection 22 and to prevent communication of fluid from the interior 20 of the first annular projection 22 to the surrounding environment.

The second annular projectin 26 has a groove 46 which retains a snap ring 48. The snap ring 48 acts on shoulder 50 of the reservoir 28 to retain the second tubular projection 32 in the second annular projection 26 and to prevent communication of fluid from the interior 24 of the second annular projection 26 to the surrounding environment.

Bore 14 in housing 12 is divided into a first diameter section 54, a second diameter section 56 and a third diameter section 58. The first diameter section 54 is separated from the second diameter section 56 by a first shoulder 52 which provides a return stop for a first piston 62. The second diameter section 56 is separated from the third diameter section 58 by a second shoulder 53 which provides a return stop for a second piston 64.

The first piston 62 is separated from the second piston 64 by a first spring 88 to establish a first pressurizing chamber 86. The housing has a first port 76 which connects the first pressurizing chamber 86 with a first set of wheel brakes 70.

The second piston 64 is separated from the end plug 90 at the bottom of bore 14 by a return spring 92. The return spring 92 establishes the size of a second pressurizing chamber 96 by holding guide surface 94 against the second shoulder 53. The housing 12 has a second port 74 which connects the second pressurizing chamber 96 with a second set of wheel brakes 72.

In more particular detail, the first piston 62 has a cylinderical body 78 with a passage 84 which connects the first port 16 with the first pressurizing chamber 86. A ledge or projection 98 which extends from the cylindrical body 78 engages the first stop 52 to limit the rearward travel of the first piston 62. A passage 110 connects the first port 16 with the first diameter section 54 of bore 14 to prevent fluid pressure from developing therein between guide surface 112 and ledge 98 due to changes in temperature. A first tubular projection 104 which extends into the first pressurizing chamber 86 from the cylindrical body 78, surrounds a second tubular projection 106 which extends from the rear of the second piston 64. Tubular projection 104 has an internal annular groove 108 adjacent end 122. A snap ring 124 expands into groove 108 to allow lip 126 on projection 106 to engage tubular projection 104. When lip 126 moves past groove 108, snap ring 124 retracts to a normal position to permit relative movement without separation between the first piston 62 and the second piston 64.

The second piston 64 has a cylindrical body 80 with a groove 128 located between a first land 68 and a second land 130. A guide surface 94 which extends into the second pressurizing chamber 96 from the cylindrical body 80 positions groove 128 adjacent compensator port 18 in housing 12. Cylindrical body 80 has an axial bore 132 which is connected to radial bore 134 for communicating fluid present at compensator port 18 into the second pressurizing chamber 96.

The communication of fluid from the reservoir container 28 into the first and second pressurizing chambers 86 and 96 is controlled by a valve seat means which engages the first and second pistons 62 and 64 to simultaneously seal passages 84 and 132.

The valve seat means includes a first valve seat means 120 located in the first pressurizing chamber 86 and a second valve seat means 136 located in the second pressurizing chamber 96.

The first valve seat means 120 includes a sleeve member 138 and an annular seal 100 which surrounds opening 102 of passage 84 in the first piston 62. The sleeve member 138 has a closed end 140 which is located adjacent seal 100. The sleeve member 138 has a groove 142 located adjacent end 144. A snap ring 146 expands to allow lip 148 on fastener member 150 to move past groove 142. A spring 152 which is located between fastener member 150 and end 140 of sleeve 138 urges snap ring 146 against lip 148 to establish the spatial distance between end 140 and face 118 on seal 100.

The second valve seat means 136 includes a sleeve member 160 and a seal 156 which surrounds opening 158 of passage 132 in cylindrical body 80. The sleeve member 160 has a closed end 162 from which stem 154 extends and an opened end 164 which surrounds projection 166 on plug 90. Sleeve member 160 has a groove 168 adjacent the opened end 164. A snap ring 170 expands in groove 168 to allow sleeve member 160 to move past lip 172. A valve return spring 174 located between projection 166 and closed end 162 positions face 176 adjacent seal 156 when snap ring 170 engages lip 172. The spatial distances between face 176 and seal 156 and end 140 and seal 100 are matched by adjusting fastener 150 with respect to threaded end 178 on stem 154. A first seal 180 surrounds stem 154, a second and third seals 182 and 184 surrounds cylindrical body 80 to prevent communication of fluid from the first pressurizing chamber 86 into reservoir section 36 by way of groove 128 or passage 132.

MODE OF OPERATION

The master cylinder assembly 10, illustrated in FIG. 1, is shown in its brake-released position. Return spring 92 and separation spring 88 bias the first and second pistons 62 and 64 against stops 52 and 53 respectively, to allow free communication between reservoir section 34 and the first pressurizing chamber 86, and reservoir section 36 and the second pressurizing chamber 96.

To effect a brake actuation of the wheel brakes 70 and 72 on the vehicle, an operator applies an input force to pedal 116. The input force applied to pedal 116 is translated into linear movement which is applied to the first piston 62 through push rod 114. Separation spring 88, being stronger than return spring 92, moves the second piston 64 at the same rate as the first piston 62 to bring seal 156 into engagement with face 176 at the same time seal 100 engages face 141 of the first valve seat means 120 and simultaneously interrupts communication between compensator ports 16 and 18 and the first and second pressurizing chambers 86 and 96. Thereafter, movement of the first and second pistons 62 and 64 simultaneously develop first and second hydraulic pressures in the first and second pressurizing chambers 86 and 96, respectively, to supply wheel brakes 70 and 72 with substantially the same brake-applying force.

When the first piston 62 moves toward the second piston 64 in the development of the first hydraulic pressure, tubular projection 104 moves on projection 106. At the same time the first valve seat means 120 moves with the first piston 62 as sleeve 138 moves on fastener 150. The first hydraulic pressure in the first pressurizing chamber 86 and spring 152 act on closed end 140 to hold face 141 against seal 100 to prevent the communication of pressurized fluid from the first pressurizing chamber 86 into passage 84.

When the second piston 64 moves toward plug 90, the second valve seat means 176 moves with the piston 64 as sleeve member 160 moves on projection 166. The second hydraulic pressure in the second pressurizing chamber 96 and return spring 174 act on closed end 162 to hold face 176 in engagement with seal 156 and prevent communication of pressurized fluid from the second pressurizing chamber 96 into passage 132.

When the input force on pedal 116 is terminated, return spring 92 sequentially moves the second piston 64 and the first piston 62 into engagement with stops 53 and 52, respectively. At the same time return spring 174 moves lip 164 into engagement with snap ring 170 to limit the movement of the second valve seat means 136 toward the second piston 64 and establish a gap between face 171 and seal 156 to allow communication between compensator passage 132 and the second pressurizing chamber 96. Since the first valve seat means 120 is tied to the second valve seat means 136, when lip 164 engages snap ring 170, lip 148 on fastener 150 engages snap ring 124 and produces a corresponding gap between face 141 and seal 100 to allow communication between compensator passage 84 and the first pressurizing chamber 86.

DETAILED DESCRIPTION OF ALTERNATE EMBODIMENT

Figures 2, 3:
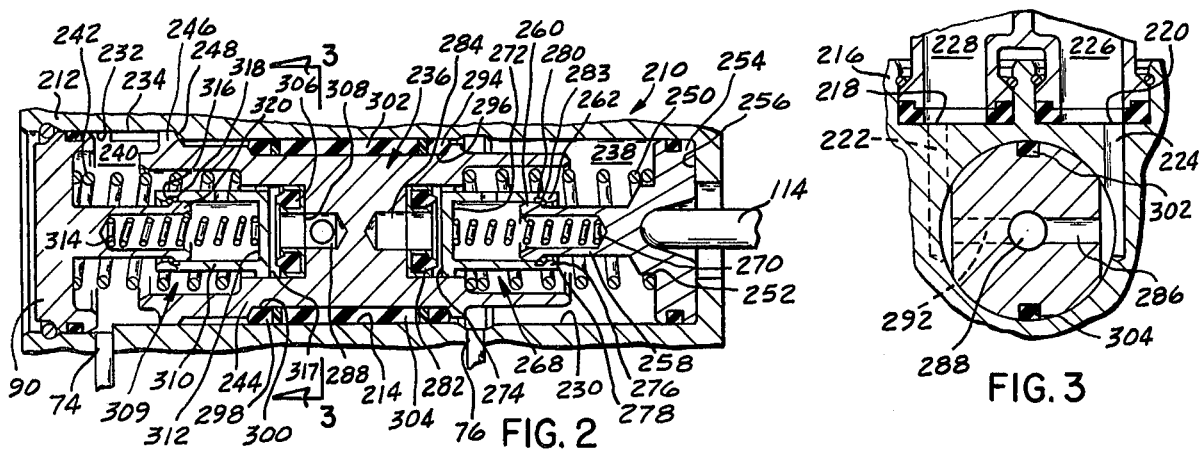
FIG. 2 is a secondary embodiment of pressurizing pistons and collapsible valve means for use in the master cylinder assembly of FIG. 1.
FIG. 3 is a sectional view taken along line 3—3 of FIG. 2.
Figure 4:
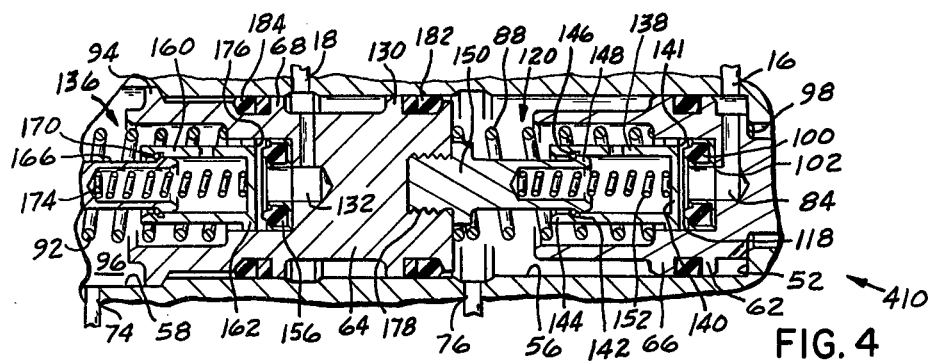
FIG. 4 is still a further embodiment of pressurizing pistons and collapsible valve means for use in the master cylinder assembly of FIG. 1.

In the master cylinder embodiments shown in FIGS. 2 and 4 wherein elements are the same as in FIG. 1, like reference numerals are utilized.

In the secondary embodiment of the pressurizing pistons of the master cylinder assembly 210 shown in FIG. 2, a housing 212 includes a bore 214 located therein. The housing 212 has an annular projection 216 which extends from the periphery thereof. The annular projection 216 has a first port 218 and a second port 220 (see FIG. 3) connected to passages 222 and 224, respectively, for connecting reservoir sections 226 and 228 with the bore 214.

Bore 214 has a first or working diameter section 230 and a second or working diameter section 232. The housing 212 has a key way 234 in the second diameter section 232 which provides a guide 246 for maintaining a second piston means 236 in substantially the same radial position in bore 214 at all times. The first or working diameter section 230 of bore 214 is divided into a first pressurizing chamber 238 and a second pressurizing chamber 240 by the second piston means 236. A return spring 242, which is located in the second pressurizing chamber 240 between plug 90 and the cylindrical body 244, holds guide 246 against stop 248 to establish the limits of the second pressurizing chamber 240. A separation spring 250 located between the cylindrical body 236 and shoulder 252 holds the first piston 254 against stop 256 to establish limits for the first pressurizing chamber 238.

The first piston means 254 has a stem 258 which extends from shoulder 252 toward the second piston means 236. The stem 258 has a rib 260 which is located on the inner surface of a sleeve member 262. The sleeve member 262 has a closed end 272 with a face 274 on one end and a lip 276 on the other end 278. A groove 280 adjacent end 278 allows a snap ring 283 to expand and allow rib 260 to move past groove 280. After rib 260 has moved past groove 280, snap ring contracts and is loosely retained in groove 280. A spring 170 located between stem 258 and the closed end 272 of sleeve member 262 holds lip 276 and snap ring 282 against rib 260 to position face 274 adjacent a first seal 282 in the second piston means 236.

The first seal 282 surrounds first passage 284 in cylindrical body 244 which connects the first pressurizing chamber 238 with reservoir chamber 226 by way of passages 286 and 220, see FIG. 3. The cylindrical body 244 has a second passage 288 which connects reservoir chamber 228 with the second pressurizing chamber 240 by way of passages 222 and 292, see FIG. 3.

A first seal 294 is located in groove 296 in cylindrical body 244 to prevent the communication of fluid between the first pressurizing chamber 238 and passages 222 and 224 in the housing 212. A second seal 298 is located in groove 300 in cylindrical body 244 to prevent communication from the second pressurizing chamber 240 into passages 218 and 220 in housing 212. First and second longitudinal seals 302 and 304 which are carried on the cylindrical body 244 prevent communication of fluid between passages 218 and 220.

A seal 306 which surrounds the opening 308 of passage 288 is secured to the cylindrical body 244.

A second valve seat means 309 has a sleeve 310 with a closed end 312 which is urged toward seal 306 by a valve return spring 314. A snap ring 316 which is loosely retained in groove 318 on the sleeve member 310 engages lip 320 to limit movement of the sleeve 310 toward the seal 306 on the second piston means 236.

The mode of operation of the master cylinder assembly 210 is as follows. An input force applied to the brake pedal is transmitted through push rod 114 to move piston 254. Return spring 242 and separation spring 250 are of the same size and therefore, are simultaneously compressed to allow face 274 on the first valve means 268 and seal 306 on the second piston means 236 to engage seal 282 and face 317 on the second valve means 308 at the same time to interrupt communication between the first and second pressurizing chambers 238 and 240 and the first and second passages 284 and 288 connected to the reservoir. Further input from the operator moves pistons 254 and 236 to develop first and second hydraulic fluid pressures for operating the first and second sets of wheel brakes 70 and 72. When the input force on push rod 114 terminates, return springs 242 and separation spring 250 move the first and second pistons 254 and 236 against stops 248 and 256 to reestablish communication of fluid between the reservoir sections 226 and 228 and the first and second pressurizing chambers 238 and 240 through compensator passages 284 and 288, respectively.

The pressurizing piston means for the master cylinder assembly 410 embodiment shown in FIG. 4, includes a fastener means 150 which is attached to the second piston 64 by threads 178. The fastener means 150 allows the position of the face 141 of the first valve seat means 120 to be adjusted with respect to seal 100. The operation of the master cylinder assembly 410 requires the return spring 92 and the separation spring 88 to be matched to each other in size. The movement of the first piston 62 in response to an input force proportionally compresses both the return spring 92 and the separation spring 88 at the same rate and permits valve seat means 120 and 136 to simultaneously engage seals 100 and 156 to interrupt fluid communication from the reservoir and permit pressurizing of fluid in the first and second pressurizing chambers at the same time and thereby synchronize the actuation of the wheel brakes 70 and 72.

I claim:
1. A master cylinder comprising:
a housing having first and second annular projections connected to a bore therein by first and second inlet ports, said bore being connected to the front and rear wheel brakes of a vehicle through first and second outlet ports, respectively;
a reservoir having a first section separated from a second section for retaining fluid, said first section of the reservoir being connected to said first port by a first tubular extension, said second section of the reservoir being connected to said second port by a second tubular extension;
a first piston located in said bore;
a second piston located in said bore, said first piston cooperating with said housing and said second piston to define a first chamber in said bore, said second piston cooperating with said housing to define a second chamber in said bore, said second piston having a first passage for connecting said first chamber to said reservoir through said first port and a second passage for connecting second chamber to said reservoir through said second port;
a first spring located between said first and said second pistons for establishing and maintaining the size of said first chamber;
a second spring located between said housing and said second piston for establishing and maintaining the size of said second chamber;
a first valve member movable relative to said first and second pistons and aligned with said first passage in said second piston;
a second valve member movable relative to said second piston and said housing and aligned with said second passage in said second piston; and
input means for moving said first piston which in turn moves the first valve marker to bring said first valve member into engagement with said second piston to interrupt fluid communication from the reservoir through said first passage, said input means simultaneously moving said second piston into engagement with said second valve member to interrupt fluid communication from the reservoir through said second passage and thereby synchronize the pressurizing of the fluid in the first and second chamber to operate the front and rear wheel brakes at substantially the same time with fluid at the same pressure.

2. The master cylinder, as recited in claim 1 wherein said first valve member includes:
a first sleeve having a first closed end and surrounding a first projection extending from said first piston; and
a third spring located between said first closed end and said first piston for urging said first sleeve toward said first passage, said first sleeve moving on said first projection when said third spring is compressed after engagement of said first closed end with said second piston to allow pressurization of fluid in said first chamber.

3. The master cylinder as recited in claim 2 wherein said second valve member includes:
a second sleeve having a second closed end and surrounding a second projection extending from said housing; and
a fourth spring located between said second closed end and said second piston for urging said second sleeve toward said second passage, said second sleeve moving on said second projection when said fourth spring is compressed after engagement of said second closed end with said second piston to allow pressurization of fluid in said second chamber.

4. The master cylinder, as recited in claim 3 wherein said second piston includes:
a cylindrical body having a guide surface therein located in a keyway in the housing for preventing said second piston from rotating to maintain the alignment of said first and second passages with said first and second inlet ports.

5. The master cylinder, as recited in claim 4 further including:
seal means for radially and axially separating said first and second passages and said first and second chambers from each other.

* * * * *